United States Patent
Horton

(10) Patent No.: US 11,591,524 B2
(45) Date of Patent: Feb. 28, 2023

(54) METHOD OF SEPARATING AND EXTRACTING RAW MATERIALS FROM ASPHALTIC LIMESTONE POWDER

(71) Applicant: Jonathon Daniel Horton, Barrington, RI (US)

(72) Inventor: Jonathon Daniel Horton, Barrington, RI (US)

(*) Notice: Subject to any disclaimer, the term of this patent is extended or adjusted under 35 U.S.C. 154(b) by 1037 days.

(21) Appl. No.: 15/972,392

(22) Filed: May 7, 2018

(65) Prior Publication Data

US 2019/0300427 A1 Oct. 3, 2019

Related U.S. Application Data

(60) Provisional application No. 62/501,783, filed on May 5, 2017.

(51) Int. Cl.
| | |
|---|---|
| *C10C 3/00* | (2006.01) |
| *C04B 2/00* | (2006.01) |
| *C04B 2/10* | (2006.01) |
| *C04B 7/34* | (2006.01) |
| *C04B 18/08* | (2006.01) |

(Continued)

(52) U.S. Cl.
CPC .............. *C10C 3/007* (2013.01); *C04B 2/005* (2013.01); *C04B 2/108* (2013.01); *C04B 7/34* (2013.01); *C04B 18/08* (2013.01); *C04B 18/20* (2013.01); *C04B 26/26* (2013.01); *C08K 3/26* (2013.01); *C08L 95/00* (2013.01); *C09C 1/02* (2013.01); *C09C 1/405* (2013.01); *C10C 3/08* (2013.01); *B02C 23/18* (2013.01);
(Continued)

(58) Field of Classification Search
None
See application file for complete search history.

(56) References Cited

U.S. PATENT DOCUMENTS 3,847,751 A 11/1974 Godino
3,976,442 A 8/1976 Paull
(Continued)

FOREIGN PATENT DOCUMENTS

| BE | 1018501 A3 * | 2/2011 | ......... B01D 11/0246 |
|---|---|---|---|
| CA | 2794046 | 5/2013 | |
| WO | WO 2011/094403 | 4/2011 | |

OTHER PUBLICATIONS

Minnesota Department of Transportation "Quantitative Extraction of Bituminous Mixtures (Centrifuge)" https://www.dot.state.mn.us/materials/manuals/laboratory/1852.pdf (Year: 2014).*

(Continued)

*Primary Examiner* — Alexandra M Moore
(74) *Attorney, Agent, or Firm* — Patent GC; Naomi S. Biswas

(57) ABSTRACT

This invention relates to manufacturing briquettes, pellets and shapes from recycled asphaltic limestone powder derived from waste residential roofing products. Briquettes and pellets are manufactured through a densification process at varying temperatures, creating recycled asphalt pellets, asphalt limestone pellets and bio mass and coal fines briquettes. Various shapes, including curbs and posts, are manufactured through heat and pressure in molds. Seawalls, walkways and wall panels are manufactured by blending asphaltic limestone powders with polymer resins and extruded or pultruded into shapes.

5 Claims, 1 Drawing Sheet

Densification of Asphalt Limestone Powders into Pellets, Briquettes and Shapes

(51) Int. Cl.
*C04B 18/20* (2006.01)
*C04B 26/26* (2006.01)
*C08L 95/00* (2006.01)
*C09C 1/40* (2006.01)
*C08K 3/26* (2006.01)
*C09C 1/02* (2006.01)
*C10C 3/08* (2006.01)
*C04B 111/00* (2006.01)
*B02C 23/18* (2006.01)

(52) U.S. Cl.
CPC ........... *C04B 2111/00586* (2013.01); *C04B 2111/00612* (2013.01); *C04B 2111/00732* (2013.01)

(56) References Cited

U.S. PATENT DOCUMENTS

| | | | | |
|---|---|---|---|---|
| 4,222,851 | A | * | 9/1980 | Good .............. C10C 3/007 208/45 |
| 4,706,893 | A | * | 11/1987 | Brock ............. E01C 19/1068 241/34 |
| 4,788,088 | A | | 11/1988 | Kohl |
| 5,236,497 | A | | 8/1993 | Bowski |
| 5,337,965 | A | * | 8/1994 | Chiovitti .............. B03B 9/065 241/DIG. 38 |
| 5,811,607 | A | | 9/1998 | Ardt |
| 7,297,301 | B1 | * | 11/2007 | Deschamps ....... B29B 17/0042 264/913 |
| 8,496,196 | B2 | | 7/2013 | Zickell |
| 8,783,590 | B2 | | 2/2014 | Zickell |
| 8,672,248 | B2 | | 3/2014 | Zickell |
| 8,789,773 | B2 | | 7/2014 | Teeter |
| 8,919,681 | B1 | | 12/2014 | Horton |
| 9,156,035 | B1 | | 10/2015 | Horton |
| 9,259,860 | B2 | | 2/2016 | Kalkanoglu |
| 9,382,423 | B2 | | 7/2016 | Bolton |
| 9,440,239 | B1 | | 9/2016 | Horton |
| 9,457,354 | B2 | | 10/2016 | Svec |
| 2011/0233105 | A1 | | 9/2011 | Bailey |
| 2015/0252534 | A1 | | 9/2015 | Dempsey |
| 2017/0204267 | A1 | * | 7/2017 | Ferguson .............. C08L 95/00 |

OTHER PUBLICATIONS

*Netafim Mesh* vs. *Micron* Comparison Chart (Year: 2015).*
International Preliminary Report on Patentability for PCT/US2018/031316.

* cited by examiner

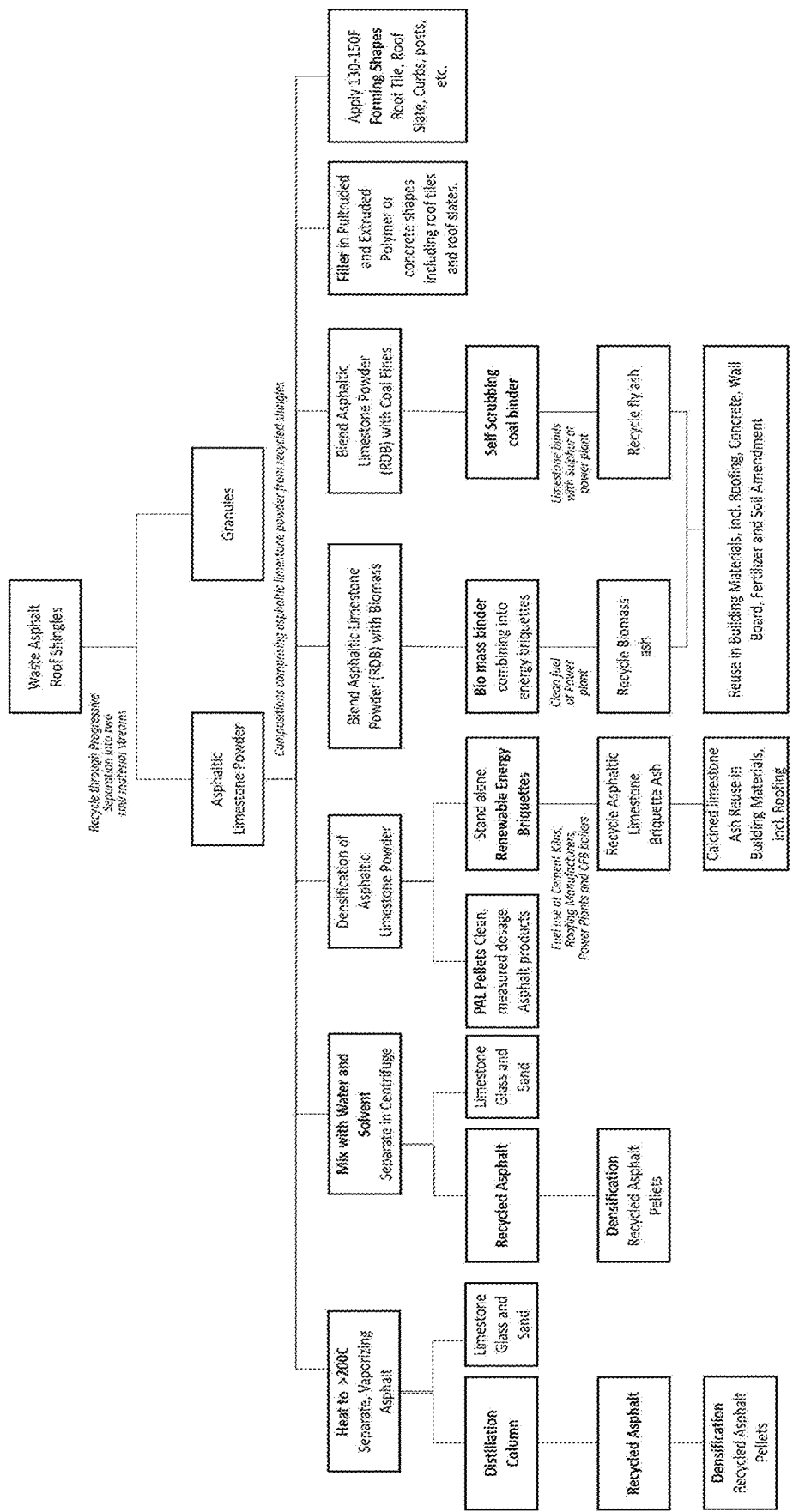

METHOD OF SEPARATING AND EXTRACTING RAW MATERIALS FROM ASPHALTIC LIMESTONE POWDER

RELATED APPLICATIONS

This application claims priority from provisional application Ser. No. 62/501,783, filed on May 5, 2017, and herein incorporated by reference.

FIELD OF THE INVENTION

The present invention is directed to a method of densifying recycled asphaltic limestone powder by applying specific and high pressure in order to form a variety of compounds, including recycled asphaltic pellets, stand-alone recycled asphaltic limestone powder fuel briquettes (without any additives) and waterproof energy sources, such as bio-mass and coal fines pellets or briquettes. Additionally, the invention is directed to a method of manufacturing shapes by blending recycled asphaltic limestone powders with resins and extruding or pultruding into specific shapes. The manufacturing process can range from 100% densified asphaltic limestone powder to 3% blend with primary ingredients or raw materials.

BACKGROUND OF THE INVENTION

There is a need in the industry for an easily and universally adopted method of manufacturing useful compositions from recycled residential roofing products. Over 12 million tons of waste are created annually in connection with residential roofing products, with 11 million tons of post-consumer tear-off debris and 1 million tons of manufacturers' waste. Contractors spend enormous amounts of money in waste hauling. This waste also is detrimental to the environment, as the asphalt shingles take up a lot of space in landfills and take several generations to decompose.

Approximately 2 million tons of asphalt roofing are simply reduced in size to be recycled into road paving products and miscellaneous asphalt based products such as asphalt crack filler, cold patch (U.S. Pat. No. 5,236,497), or other pavement repair products (U.S. Pat. No. 4,706,893, US Publication No. US 2011/0233105), or are recycled into a biofuel or bio-oil diluent for paving (US Publication No. 2015/0252534), or as a blended coating for new shingles (U.S. Pat. Nos. 9,259,860, 9,457,354). An additional 2.0 million tons of roof waste are recycled into raw materials. These established end uses of recycled asphalt roofing shingles still leave 8.0 million tons of shingles filling landfills annually. Accordingly, there is a need in the industry for methods which use recycled residential asphalt roofing products to make useful compositions.

The present invention addresses the need in the industry of utilizing the waste created by recycling asphalt roofing shingles and builds on the new technologies that separate waste roof shingles into granules and asphaltic limestone powder. See Horton, U.S. Pat. No. 9,440,239. Since asphaltic limestone powder makes up 50%-80% of the products recovered from recycled shingles, there is a need in the industry for processes which turn the large volumes of recycled asphaltic limestone powder into useful compositions.

Although prior patents have disclosed asphalt pellets and bricks made from recycled asphalt shingles (See Zickell U.S. Pat. Nos. 8,496,196; 8,783,590; and 8,672,248), such compressed asphalt powder bricks and pellets also include granules, reducing energy value and ignition capabilities. Such past compositions are not as effective as the densified pellets or briquettes made according to the present invention, as granules in the past compositions created less asphalt as a percentage of total product, reducing its binding capabilities.

Asphaltic limestone powder containing less than 10% granules may be bound together, through pressure only, creating pellets or briquettes, with uses including a specialized fuel at calcined limestone using facilities, roofing manufacturers and the world's lignite coal market. The stand-alone pellets can also be introduced as a part of paving manufacturer's design mix and roofing manufacturers coating mixes more easily.

SUMMARY OF THE INVENTION

The present invention is directed to a method of manufacturing an asphalt briquette or pellet, the method comprising: (a) obtaining recycled asphaltic limestone powder less than about 2380 microns in size with a mean size of less than about 150 microns, and (b) densifying the recycled asphaltic limestone powder, as a refuse derived binder, by applying specific and high pressure, resulting in the formation of a pellet or briquette. In one embodiment, the pellet or briquette manufactured by the present densification process comprises (a) less than 20% of materials other than limestone or asphalt, (b) asphalt in an amount ranging from about 10 wt % to about 50 wt %, and (c) limestone in an amount ranging from about 50 wt % to about 90 wt %. In another embodiment, the materials other than limestone or asphalt are selected from the group consisting of granules, trap rock, fiberglass powder and aggregates. In a preferred embodiment, the recycled asphaltic limestone powder used as a starting material for the present densification process contains less than 10% granules.

The present invention is also directed to an asphalt briquette or pellet made according to the above-described densification process. In one embodiment, the asphaltic limestone powder btu/lb. content of the briquette ranges from about 4,000-12,000. In another embodiment, the moisture content of the briquette or pellet is less than 3%.

The briquette made according to the densification process of the present invention can be used as a stand-alone fuel source or can be combined with other fuel source materials. In one embodiment, the briquette can be combined, acting as a refuse-derived binder, with either a bio-mass, such as torrefied bio-mass, or coal fines. In one embodiment, the asphalt briquette is blended into the coal or bio-mass at about 5-20%. This combination of densified asphaltic briquette combined with either a bio-mass or coal fines is stabilized for shipping and storage.

In another embodiment, the densified recycled asphaltic limestone pellet of the present invention can be combined into a polymer related product. In one embodiment, the polymer related product is selected from the group consisting of polymer pultruded or extruded shapes. In another embodiment, the polymer related product is selected from the group consisting of formed fiberglass structural shapes and walls, and the formed fiberglass structural walls are further selected from the group consisting of platforms and sea walls made of pultrusion or extrusion technology.

The invention is also directed to a method of burning fuel, comprising burning a fuel source to generate energy, wherein the fuel source comprises the asphalt briquette made by the present densification process as a stand-alone fuel briquette with no additives. In a further embodiment, the stand-alone fuel briquette burns the asphalt for energy and calcines the limestone. In yet another embodiment, the calcined asphaltic limestone powder is created after burning for energy in an amount ranging from about 5% wt % to about 55 wt %. In another embodiment, the calcined limestone is reused in materials, selected from the group consisting of roofing, concrete, wall board, fertilizer and soil amendment.

In another embodiment, the briquette made according to the present invention is used as a specialized fuel at calcined limestone using facilities, or at proximity cement manufacturers, roofing manufacturers, lignite coal using power plants and circulating fluidized bed (CFB) boiler systems. In another embodiment, the burning of the asphalt briquette creates an ash from the calcined limestone powder that is a noncombustible filler to be incorporated into a clinker material or used to reduce emissions from the boiler.

In another embodiment, the asphaltic limestone may be pelletized through heating, followed by cooling, shaping, and further cooling. In this embodiment, the asphaltic limestone is heated to greater than 200° C., more preferably between 300-500° C., vaporizing the asphalt into a distillation column and harvesting limestone, glass and sand. The limestone, glass and sand are thus separated from the vaporized asphalt. Following the heating and separation step, the vaporized asphalt is cooled to about 100-200° C. At this reduced temperature, the asphalt is pressed into a pellet. The asphalt pellet is then further cooled to about room temperature.

In another embodiment, the asphaltic limestone may be mixed with water and any mild bio-degradable solvent, including but not limited to limonene. The mixture is then spun in a centrifuge, separating asphalt from limestone, glass and sand. In preferred embodiments, the mixture is spun at about 3,600-6,000 rpms, to about 100-145° C. Following the separation by centrifuge, the bio-degradable solvent is collected in a solvent recovery process and the asphalt is pressed into a pellet. The asphalt pellet is then further cooled to about room temperature.

BRIEF DESCRIPTION OF THE DRAWINGS

FIG. 1 shows a diagram of the densification process of recycled asphaltic limestone powder and the various compositions that can be made by the present process.

DETAILED DESCRIPTION OF INVENTION

This invention relates to manufacturing briquettes, pellets and shapes from recycled asphaltic limestone powder derived from waste residential roofing products. The briquettes and pellets are manufactured through a densification process at high pressure and varying temperatures, creating recycled asphalt limestone pellets, asphaltic pellets, and bio mass and coal fines briquettes. Various shapes, including curbs and posts, are manufactured through heat and pressure in molds. Seawalls, walkways and wall panels are manufactured by blending asphaltic limestone powders with polymer resins and extruded or pultruded into shapes.

Densification Process

The starting materials in the densification process comprise asphaltic limestone powder, recovered from recycling shingles. The recycled asphaltic limestone powder can be less than about 2380 microns in size with a mean size of less than about 150 microns. The asphalt content can be larger than 10% and less than 50%. The limestone content can be less than 90% and more than 50%. Asphaltic limestone powder, when recovered from waste shingles, may contain less than 20% of materials that are neither limestone nor asphalt, for example trap rock, fiberglass powder and aggregates. The present invention provides an economic process for converting up to 80% of the asphalt shingle waste to energy.

High pressure is applied to the starting materials in order to form pellets or briquettes. In one embodiment, the starting material is formed into disks, and then pressure is applied to the disks. In this embodiment, the material is contained in an enclosed die and is static. Pressure can be applied by a piston press or by other means. The pressure to be applied can range from 5,000 lbs to 20,000 lbs. In a preferred embodiment, pressure is applied by the piston press at 10,000 lbs. The area of the disk to which pressure is applied can range from 0.5 inches to 5 inches. In a preferred embodiment the disk size is 1.23 square inches. In a preferred embodiment, 10,000 lbs of pressure is applied to a disk of 1.23 square inches, which calculates to 8,130 lbs of pressure per square inch.

In another embodiment, a non-static process is used. In this embodiment, moving rolls are used to apply pressure over a surface which is not flat. In this embodiment, the process is not enclosed or static. The roll separating force hydraulic pressure for the briquette can range between 500 and 2,500 lbs, and preferably is 1,500 lbs. The briquetter can deliver 11 tons of separating force at 3,000 lbs of hydraulic pressure. The difference has to do with the size of the two hydraulic pistons on the briquetter. The 1,500 lbs equates to about 5 tons or 10,000 lbs. of force per linear inch of the briquette. Because the process is not enclosed or static, only the length of the briquette in measured in linear inches, rather than square inches. The briquette can range from 0.5 to 3 inches long, and is preferably between 1-2 inches, and most preferably is 1.625 inches long. This equates to 6,154 lbs of force the briquette is seeing. Higher separating force can also be applied.

In another embodiment, the asphaltic limestone may be pelletized through heating, followed by cooling, shaping, and further cooling. In this embodiment, the asphaltic limestone is heated to greater than 200° C., more preferably between 300-500° C., vaporizing the asphalt into a distillation column and harvesting limestone, glass and sand. The limestone, glass and sand are thus separated from the vaporized asphalt. Following the heating and separation step, the vaporized asphalt is cooled to about 100-200° C. At this reduced temperature, the asphalt is pressed into a pellet. The asphalt pellet is then further cooled to about room temperature.

In another embodiment, the asphaltic limestone may be mixed with water and any mild bio-degradable solvent, including but not limited to limonene. The mixture is then spun in a centrifuge, separating asphalt from limestone, glass and sand. In preferred embodiments, the mixture is spun at 3,600-6,000 rpms, to about 100-145° C. Following the separation by centrifuge, the bio-degradable solvent is collected in a solvent recovery process and the asphalt is pressed into a pellet. The asphalt pellet is then further cooled to about room temperature.

Compositions Produced by Densification Process

The densification process results in the formation of a variety of specialized recycled asphaltic limestone powder compositions for use in a variety of industries.

Stand Alone Asphaltic Limestone Briquette Waste to Energy

In one embodiment, the densification process of the present invention results in the manufacture of recycled asphaltic limestone pellets or briquettes with no added ingredients. Such briquettes are a very specialized fuel source for industries which utilize limestone in manufacturing, for example the asphalt roofing industry. The asphaltic limestone fuel briquettes, after use, leave a calcined lime ash which can be reused in building materials, including roofing, concrete, wall board, fertilizer and soil amendment. The pellets are also more easily stored and metered in as an ingredient to materials that are manufactured with asphalt and limestone, for example asphalt roofing shingles, asphalt roads, asphalt sealants and cold patch products.

Past compositions are not as effective a fuel as the compositions made according to the methods of the present invention, as granules in past compositions created less asphalt as a percentage of total product, reducing its calorific energy. Asphaltic limestone powder pellets or briquettes made in accordance with the instant densification methods and containing less than 10% granules have a BTU per pound per hour (btu/lb.) content of 5,000-7,000, which is much greater than the btu/lb content of 3,000-5,000 for past compositions with granules included. The BTU value of the powder produced from a full shingle may range from 3,000-5,000 Btu/lb, depending on the percentage of granules in powder. The densified asphaltic limestone powder bricks, pellets or briquettes made according to the densification process of the present inventions, when compared to prior compositions, have increased asphalt content and therefore have higher btu/lb values. These BTU values are shown in Table 1 below.

TABLE 1

Calorific Energy Value of Asphaltic Limestones vs Fully Recycled Asphalt Shingles

| Sample Type | Btu/Lb. Gross Calorific Value (GCV) | % Limestone | % Granules | Btu/lb. Net of Limestone and Granules |
|---|---|---|---|---|
| Asphalt | 17,500 | 0% | 0% | 17,500 |
| Asphaltic Limestone | 17,500 | 62% | 5% | 5,775 |
| Asphaltic Limestone | 17,500 | 62% | 8% | 5,250 |
| Full Shingle to Powder | 17,500 | 53% | 23% | 4,200 |
| Full Shingle to Powder | 17,500 | 53% | 27% | 3,500 |

Additionally, the present invention increases the attractiveness of waste to energy initiatives that include waste roofing shingles as the calorific value is similar to lignite coal. Lignite coal is the lowest rank of coal with the lowest energy content. It is crumbly with a high moisture content and accounts for 8% of U.S. coal production or 72 million short tons in 2015. Lignite coal sources co-exist with its customer in a captive market as it is not competitive to ship low calorific coal long distances nor is it feasible for the consumer of lignite coal to purchase fuels from distant mines. It is common to build lignite-fired plants adjacent to lignite mines, forming a single economic entity or industrial symbiosis. There is a need in the U.S. market place for a dense, lignite comparable fuel source serving a captive and specific market.

The stand-alone renewable energy briquette manufactured according to the method of the present invention is comparable to lignite, but may be used in a broader variety of markets, since it does not have the same shipping issues which are associated with shipping lignite coal. The densification process of the present invention results in briquettes with a moisture content of less than 3%, and when the briquettes were subjected to a crush test, they flattened but did not break. Because the briquettes made according to the present method are less crumbly than lignite coal, they can be shipped greater distance without falling apart. The briquettes made from recycled asphaltic limestone powder may therefore be used in cement manufacturers, roofing manufacturers, lignite coal using power plants and circulating fluidized bed (CFB) boiler systems. When used in a circulating fluidized bed (CFB) boiler, past compositions were not as effective as the recycled asphaltic limestone briquettes made according to the present invention, as the granules in the past compositions could cause abrasion in the boiler.

Calcined Limestone Ash

Fuel pellet and briquette compositions disclosed in the present invention, either as a standalone or as a binder to other energy sources, have a lower loss of ignition than previous fuel briquettes, and once utilized as fuel form a calcined limestone ash as a noncombustible portion. This calcined limestone ash can then be used in building materials such as asphalt roofing, concrete roads and wall boards, thus achieving cradle to cradle recycling. This noncombustible material can also be incorporated into a roofing shingle as a raw material, replacing 5-50% of the calcium carbonate used in asphalt shingle coatings. The resulting material blends well with virgin calcium carbonate, as the ash is 70-100% calcined calcium carbonate. The ash can also be a noncombustible filler to be incorporated into a clinker material or used to reduce emissions from the boiler. Table 2 shows this calcined ash can be used as roofing shingle filler, clinker material, or emission reduction material.

TABLE 2

ASH - Used as Roofing Shingle Filler, Clinker Material or Emission Reduction Material

| Sample ID | Btu/Lb (GCV) | LOI % | Hg (ppb) |
|---|---|---|---|
| Asphaltic Limestone Powder Recycled Roofing Shingles | 5324 | 49.76 | 259 |

TABLE 3

Asphaltic Limestone Pellet ASH Analysis

| ANALYSIS OF ASH | | Result | Method |
|---|---|---|---|
| Basis | | | ASTM D6349 |
| Silicon Dioxide | $SiO_2$ | 37.93% | ASTM D6349 |
| Aluminum Oxide | $Al_2O_3$ | 7.03% | ASTM D6349 |
| Titanium Dioxide | $TiO_2$ | 0.66% | ASTM D6349 |
| Iron Oxide | $Fe_2O_3$ | 4.61% | ASTM D6349 |
| Calcium Oxide | CaO | 35.02% | ASTM D6349 |
| Magnesium Oxide | MgO | 10.53% | ASTM D6349 |
| Potassium Oxide | $K_2O$ | 0.97% | ASTM D6349 |
| Sodium Oxide | $Na_2O$ | 1.09% | ASTM D6349 |
| Sulfur Trioxide | $SO_3$ | 1.86% | ASTM D5016 |
| Phosphorous Pentoxide | $P_2O_5$ | 0.10% | ASTM D6349 |
| Strontium Oxide | SrO | 0.05% | ASTM D6349 |
| Barium Oxide | BaO | 0.03% | ASTM D6349 |
| Manganese Oxide | MnO | 0.12% | ASTM D6349 |
| Undetermined | $SO_4$ | 0.00% | |
| Sum of Oxides | | 100.00% | |
| Silica Value | | 43.06 | |
| Base Acid Ratio | | 1.14 | |
| T250 Temperature | | 2461° F. | |
| Fouling Index | | 1.09 | |
| Type of Ash | | LIGNITIC | |

Asphaltic Limestone Powder as a Refuse Derived Binder

The densified recycled asphaltic limestone powder made according to methods of the present invention can be compressed into artificial stone, road paving, standalone pellets or as a binder to lime pellets, coal fines, bio-mass (including torrefied bio-mass) and other briquettes. The costs are lower and the binder is a substitute for virgin asphalt. In the case of recycled asphaltic limestone powder binding coal fines, the calcium in the limestone reacts to sulfur in the coal, capturing the sulfur. The recycled asphaltic limestone powder may be combined into a pellet of coal, pyrolyzed or carbonized, fixing the carbon in a calcium compound which remains stable in the ash after the pellets are burned as fuel. The asphaltic limestone binder is blended at 5%-20% with various energy products, including coal, waterproofing for shipping and storage. The compressive strength is stable for shipping without excessive breakage or crumbling.

The pellets or briquettes manufactured according to the densification process of the present invention can be combined with bio-mass or coal fines. Bio-mass and coal fines fuel briquettes are manufactured by blending 3-30% asphaltic limestone powder with the primary energy source, binding and waterproofing the primary material.

Coal fines refers to coal with a maximum particle size, usually less than one-sixteenth inch and rarely above one-eighth inch. Bio-mass fuels are organic materials produced in a renewable manner. Two categories of bio-mass fuels, woody fuels and animal wastes, comprise the vast majority of available biomass fuels. Municipal solid waste (MSW) is also a source of biomass fuel. Wood wastes of all types make excellent biomass fuels and can be used in a wide variety of biomass technologies. Different types of woody fuels can typically be mixed together as a common fuel, although differing moisture content and chemical makeup can affect the overall conversion rate or efficiency of a biomass project. There are at least six subgroups of woody fuels, including (1) forestry residues, including in-forest woody debris and slash from logging and forest management activities, (2) mill residues, including byproducts such as sawdust, hog fuel, and wood chips from lumber mills, plywood manufacturing, and other wood processing facilities, (3) agricultural residues, including byproducts of agricultural activities including crop wastes, vineyard and orchard prunings or turnings, and rejected agricultural products, (4) urban wood and yard wastes, including residential organics collected by municipal programs or recycling centers and construction wood wastes, (5) dedicated biomass crops, including trees, corn, oilseed rape, and other crops grown as dedicated feedstocks for a biomass project, and (6) chemical recovery fuels (black liquor), including woody residues recovered out of the chemicals used to separate fiber for the pulp and paper industry.

Past compositions were not as effective a fuel binder as the briquette made in accordance with the present densification process, as granules present in such compositions created less asphalt as a percentage of total product, creating voids and reducing its binding capabilities Although lime pellets comprising lime and asphalt compatible binder have been previously disclosed (See U.S. Pat. No. 8,182,726), the present densified recycled asphaltic limestone pellets have benefits over such prior pellets as they can be used as a binder more efficiently. The process of making lime pellets is more efficient using the pellets made according to the present invention, because the limestone in the present pellets can be converted to quicklime, the quicklime is hydrated, and the pellet is formed in a continuous process or in a single system. The pellets are useful for conditioning an end product of hot mix asphalt.

Asphaltic Limestone Powder as Fillers

The densified recycled asphaltic limestone powder made in accordance with the present invention can be used as a filler in polymer formed fiberglass structural shapes and walls, such as platforms and sea walls made of pultrusion or extrusion technology. Seawalls, walkways and wall panels are manufactured by mixing recycled asphaltic limestone powders with various resins and extruded or pultruded into shapes. Asphaltic limestone powder containing less than 10% granules has a smaller mean size of between 200 and 100 microns versus with granules included, allowing for lower viscosity of the resulting mixture. The various shapes are manufactured by heating asphaltic limestone material to greater than 130 degrees Fahrenheit and pressing into molds creating shapes such as posts and curbs.

EXAMPLES

Example 1—Coal Fines Combined with Powdered Asphaltic Limestone (PAL)

Briquettes were made with splits of a sample of bituminous coal fines (RVSB) obtained from the screen-bowl discharge at the River View preparation plant located near Waverly in Western KY. Samples of PAL were blended with the RVSB coal fines at 5 wt % and 20 wt % with briquettes formed in a Komarek model B-100 roll briquetter at a roll force of 90 kN and production rate of ~40 kg/hr. To provide basis for comparison, a sample of the RVSB coal without an added binder was briquetted and tested in a like manner. Immediately following production, each of the briquetted samples was processed across a Sweco mechanical screener fitted with a 4 mesh screen to remove fines. Randomly selected briquettes were then subjected to compressive strength testing at 30 minutes following production (green strength). The remaining briquettes were cured in a controlled-environment chamber at 22.3° C. (72° F.) and 70% relative humidity for 7 days then tested for cured compressive strength, resistance to attrition, and resistance to water degradation.

Example 2—Analysis of Briquettes from Example 1

Various tests were conducted on the briquettes produced in Example 1, to measure green strength, cured strength, resistance to attrition, and resistance to water degradation.

A Lloyd Instruments, LRX Plus compressive meter fitted with a 1.9-cm (0.75-inch) diameter plunger was used to determine average compressive strengths of the briquettes generated in Example 1. The compressive meter was mounted to an automated test stand operated at a constant downward speed of 2.5 cm/min (1-in/min) with force applied along the same axis as applied by the briquetter rolls.

Resistance to attrition was determined on the cured briquettes made according to process outlined in Example 1 by loading ~200 g of each briquetted sample (~20 briquettes) into a 30-cm (12") diameter Plexiglas cylinder equipped with three, 5-cm (2") lifters; tumbling for five minutes at 40 rpm; and mechanically screening for 3 minutes in a Ro-Tap sieve shaker fitted with a 4-mesh screen. The average attrition index (AI) was reported as the fraction of the starting briquette weight that was retained on the 4-mesh screen. Higher attrition indices are indicative of greater durability.

Resistance to water degradation was determined by weighing 10 cured briquettes prepared according to Example 1, submerging the briquettes in a water for one hour and then visually classifying the briquettes as either intact, partially degraded, or fully degraded. Briquettes that classify as intact are retrieved, equilibrated in room air for 30 minutes, re-weighed to determine water uptake, then crushed to determine their post-submersion compressive strength.

The measured green strength, cured strength, resistance to attrition, and resistance to water degradation for the three briquetted samples are shown in Table 4.

TABLE 4

Results of Briquette testing

| Lab # | Briquette description | Compressive Strengths | | | | Attrition Index | Water degradation | | | Average Briq weight (g) |
| --- | --- | --- | --- | --- | --- | --- | --- | --- | --- | --- |
| | | 30 min ($lb_f$) | 30 min st dev | 7 day ($lb_f$) | 7 day st dev | | Post Submersion | Water Uptake (%) | Wet Comp Str (lbf) | |
| 29-61-2 | RVSB coal w/o binder | 49.9 | 10.81 | 56.3 | 12.89 | 0.52 | intact | 11.1% | 31.6 | 8.16 |
| 29-61-3 | 20% PAL/80% RVSB | 104.0 | 17.99 | 108.1 | 13.39 | 0.84 | intact | 1.0% | 102.3 | 9.45 |
| 29-61-4 | 5% PAL/95% RVSB | 71.6 | 12.03 | 77.3 | 17.48 | 0.61 | intact | 3.8% | 67.8 | 8.79 |

Green strengths is an indicator of the likelihood the briquettes will maintain their integrity as they are dropped from the briquetter onto a belt and conveyed to storage while cured strength is more indicative of their ability to withstand the rigors of subsequent shipping and handling. Although the compressive strength that will be required for a given scenario is dependent on the severity of handling prior to and after curing, green compressive strengths greater than about 50 lbf and cured strengths greater than about 100 lbf are generally classified as acceptable. By these criteria, both of the briquetted samples containing PAL exhibited an acceptable green strengths while that of the binderless briquettes was marginal. After curing, at 108, only the briquettes made with 20% PAL exhibited a compressive strength greater than the 100 lbf criteria. Additionally, the 77 lbf compressive strength of the 5% PAL briquettes was significantly better than the 56 lbf strength observed for the binderless briquettes.

The attrition index is an indicator of a cured briquette's propensity to produce fines during shipping and handling. Although not a rigid standard, attrition indices less than 0.80 are generally classified as poor, 0.80-0.90 as marginally acceptable, 0.90-0.95 as good, and greater than 0.95 as excellent. While the 5% PAL briquettes did perform better than the binderless briquettes (0.61 vs 0.52), only briquettes made with 20% PAL met the minimum 0.80 value with an attrition index of 0.84.

All three of the briquetted samples survived a one hour submersion in water thereby demonstrating a least some resistance to water degradation. However, the extent of water uptake and post submersion compressive strength indicated that the water resistance of the briquettes made with PAL was substantially better than that of the briquettes made without a binder. In contrast to the binderless briquettes, both the 5% or 20% PAL briquette samples exhibited very low levels of water uptake and an insignificant loss of compressive strength during submersion.

Example 3

In the briquettes produced according to Example 1, major and trace elements were measured via X-ray diffraction and X-ray fluorescence, respectively. Calorific value was determined in a bomb calorimeter according to ASTM-D5865, Mercury according to ASTM-D6722, loss on ignition (LOI) according to ASTM D7348, and TCLP according to EPA Test Method 1311. The results are shown in tables 5, 6, 7, and 8 below.

TABLE 5

Major elements in the ash (PAL sample was ~50% ash)

| Sample ID | Lab ID | SiO2% | Al2O3% | Fe2O3% | CaO % | MgO % | Na2O % | K2O % | P2O5% | TiO2% | SO3% |
| --- | --- | --- | --- | --- | --- | --- | --- | --- | --- | --- | --- |
| PAL | 29-60-1 | 38.91 | 8.54 | 3.98 | 32.9 | 9.92 | 1.1 | 0.83 | 0.14 | 0.57 | 2.46 |

TABLE 6

Minor elements in PAL sample on an as-received basis (i.e., whole sample basis)

| Sample ID | V ppm | Cr ppm | Mn ppm | Co ppm | Ni ppm | Cu ppm | Zn ppm | As ppm |
| --- | --- | --- | --- | --- | --- | --- | --- | --- |
| PAL | 132 | 64 | 431 | 26 | 80 | 52 | 449 | <1 |

| Sample ID | Rb ppm | Sr ppm | Zr ppm | Mo ppm | Cd ppm | Sb ppm | Ba ppm | Pb ppm |
| --- | --- | --- | --- | --- | --- | --- | --- | --- |
| PAL | 168 | 159 | 111 | <1 | <1 | <1 | <1 | 76 |

TABLE 7

Heating value, loss on ignition (LOI) and mercury content of PAL sample

| Sample ID | Btu/Lb (GCV) | LOI % | Hg (ppb) |
| --- | --- | --- | --- |
| Asphaltic Limestone Powder Recycled Roofing Shingles | 5324 | 49.76 | 259 |

TABLE 8

| | | Results of TCLP analysis of PAL sample | | | | | | | |
|---|---|---|---|---|---|---|---|---|---|
| MA Number | Sample ID | Cr ppm | As ppm | Se ppm | Ag ppm | Cd ppm | Ba ppm | Hg ppm | Pb ppm |
| 76282 | 29-60-1 | <1 | <1 | <1 | <1 | <1 | <1 | <1 | <1 |

While the invention has been particularly shown and described with reference to certain embodiments, it will be understood by those skilled in the art that various changes in form and detail may be made without departing from the spirit and scope of the invention. The scope of the present invention should, therefore, be determined only by the following claims.

The invention claimed is:

1. A method of separating and extracting raw materials from asphaltic limestone powder, the method consisting of:
 (a) obtaining recycled asphaltic limestone powder less than about 2380 microns in size with a mean size of less than about 150 microns, wherein the recycled asphaltic limestone powder comprises asphalt, limestone, glass and sand,
 (b) mixing the recycled asphaltic limestone powder with water and a bio-degradable solvent to produce a mixture, and
 (c) spinning the mixture from step b in a centrifuge, thereby separating the asphalt from the limestone, glass and sand.

2. The method of claim 1, wherein the recycled asphaltic limestone powder contains less than 10% granules.

3. The method of claim 1, wherein the centrifuge spinning occurs in a temperature range of from 100-145° C.

4. The method of claim 1, wherein the biodegradable solvent is limonene.

5. The method of claim 1, wherein the mixture is spun in a centrifuge at 3,600-6,000 rpms.

* * * * *